METHOD OF ASSEMBLY OF ELECTRONIC COMPONENTS

Original Filed Nov. 29, 1963

INVENTOR.
WESLEY N. LINDSAY
BY John J. Leavitt 3,346,933
Patented Oct. 17, 1967

3,346,933

METHOD OF ASSEMBLY OF ELECTRONIC COMPONENTS

Wesley N. Lindsay, San Jose, Calif., assignor to Jennings Radio Manufacturing Corporation, San Jose, Calif., a corporation of Delaware Original application Nov. 29, 1963, Ser. No. 326,696. Divided and this application Oct. 21, 1965, Ser. No. 509,249
8 Claims. (Cl. 29—25.41)

This is a division of application Ser. No. 326,696 filed Nov. 29, 1963, and now abandoned.

The invention relates to a method of assembly of electronic components, and is explained with particular reference to vacuum capacitors of the spirally-wound type.

Conventional capacitors are usually of two types; namely, fixed and variable, with each type utilizing either vacuum or some other insulating material to electrically isolate opposed plates. Vacuum capacitors, of both the fixed and variable variety, have found wide usage and popularity. In these capacitors, a plurality of radially spaced concentrically arranged capacitor plates arranged in sets are interleaved so as to provide a pre-determined amount of opposed surface area. The opposed plates are held apart by the inherent rigidity of the plates themselves, and the dielectric medium which electrically isolates opposed sets of plates is formed by the vacuum within the hermetically sealed envelope. One of the disadvantages of this construction is that the plates of each set are unsupported over their entire length. The length and thickness of the capacitor plates must accordingly be proportioned to provide a rigidity which is compatible with the vibration and shock characteristics of the application for which the capacitor is designed. Thus, as the plates become longer they must be thickened to provide the desired rigidity, and usually must be radially spaced a greater distance apart because with the longer plates even a small amount of vibration adjacent the root of a plate is greatly magnified at the free ends of the plates, thus undesirably varying the concentricity and therefore the capacitance of the unit.

This has necessitated relatively wide spacing between the plates to prevent plates of opposite sets from physically contacting to thereby effect a short circuit. Nevertheless, there are definite advantages to the use of a vacuum as a dielectric. One of these is the tendency of any arc or short to be shortlived. Stated another way, a vacuum dielectric capacitor possesses a quick recovery capability not found in capacitors utilizing other dielectrics.

Another disadvantage has been the extreme care with which the relatively fragile capacitor plates must be handled in order to prevent nicks, dents, and displaced portions such as dimples, which will cause variations in the spacing between plates, thus varying the capacitance characteristics and the break-down voltage characteristics of the capacitor.

In conventional wound capacitors, it has been common practice to utilize a strip of dielectric material sandwiched between opposed strips of conductive material. In such capacitors, the dielectric strip functions to electrically separate the opposing surfaces of the metallic capacitor plates. In some instances the dielectric material is a solid dielectric layer, whereas in other instances a woven dielectric fabric has been interposed between the capacitor plates. Where a solid sheet or strip of dielectric material is utilized as the dielectric between opposing plates, it is well known that the layer of dielectric material must withstand high voltage gradients. These high voltage gradients impose severe limitations on the capacitance characteristics of fixed capacitors utilizing a solid dielectrc layer or strip. In wound capacitors utilizing the woven dielectric fabric between opposed capacitor plates, the fabric has functioned only as a mechanical support and not as electrical insulation between the plates, this function being performed by an oil or gas filling under a pressure sufficient to raise the breakdown voltage to the required level. Capacitors of this type are usually merely hermetically sealed, but in no instance has it been found that such a capacitor was enclosed in an evacuated chamber.

Accordingly, it is one of the principal objects of the present invention to provide a convolutely wound capacitor in which opposing plates of the capacitor, i.e., the cathode and anode, are spaced apart by a woven dielectric material which functions primarily to provide a predetermined spacing between opposed plates, and which does not determine the breakdown voltage between plates.

Another important object of the invention is the provision of a vacuum fixed capacitor in which the capacitor cathode-anode plate assembly comprises a pair of elongated metallic strips mechanically held apart by a pair of woven dielectric strips, the four strips being convolutely wound into a tightly compacted mass in which the entire lengths of the capacitor plates are supported against vibration and shock.

It has been found advisable in vacuum capacitors to process the capacitors at high temperatures in order to drive off occluded gases from the metal parts of the capacitor. In order to achieve satisfactory out-gassing, it has been found that the use of ceramic as an envelope material is superior to glass in that the ceramic may be processed at higher temperatures, thus facilitating and improving out-gassing of the metal components of the vacuum unit. One of the difficulties however has been that there is a wide variation of the thermal expansion and contraction characteristics between ceramic and metal parts which must be hermetically united to form a vacuum-tight envelope.

Ceramic may be hermetically brazed to an adjacent metal part, but provision must be made to accommodate the difference in thermal expansion and contraction of parts so united if long life is to be expected. Various methods of uniting adjacent metal and ceramic parts have been utilized, some involving graded seals in which there is a gradual matching of thermal expansion and contraction characteristics between the dielectric and adjacent metal, and others involving a multiplicity of flexible flange or ring type members which are interposed in various configurations between the ceramic and the adjacent heavy metal part to accommodate differences in thermal expansion and contraction. Such configurations, while they solve the thermal expansion and contraction problem, often create other problems such as sharp projections increasing the susceptibility of arc-over, often considerably increase the space requirements of the device on which they are used, and increase the length of the path over which current must flow, thus increasing inductance. It is accordingly another important object of the present invention to provide a compact vacuum tight and strain-free flexible seal between an adjacent heavy metal member and a ceramic member to which it is brazed.

The invention possesses other objects and features of advantage some of which, with the foregoing, will be apparent from the following description and the drawings. It is to be understood however that the invention is not limited to the embodiment shown, as it may be embodied in various forms within the scope of the appended claims.

Briefly considered, the convolutely wound fixed capacitor of the invention comprises a capacitor assembly fabricated from a pair of elongated conductive metallic strips, conveniently OFHC copper or aluminum, between which is sandwiched a first strip of dielectric material such as low-loss woven quartz cloth. A second strip of the same material is superposed on the opposite side of one of the metal strips so that when the strips are wound the convolutions will be uniformly spaced by an intervening layer of dielectric. The opposed capacitor plates are wound so that adjacent edges of the opposed plates are laterally offset, so that opposite edges of adjacent plates may be conductively brazed to appropriate end plate assemblies. The end plate assemblies are held apart by and hermetically united to a dielectric envelope portion which encloses the convolutely wound capacitor plates. In order to effect a flexible hermetic union between each closely adjacent heavy metallic end plate and ceramic envelope portion, a seal is provided which is both compact and which possesses a configuration suitable for accommodating differences in thermal expansion and contraction between the metal and dielectric portions of the envelope. Means are provided within the capacitor to insure against unwinding of the spirally wound capacitor plates.

Referring to the drawings.

In terms of greater detail, the spiral or convolutely wound fixed capacitor of the invention comprises a pair of elongated conductive metallic strips 2 and 3 having their opposed flat surfaces 4 and 6, respectively, lying in parallelism and held apart by parallel and alternately arranged strips of woven dielectric material 7, preferably woven from quartz or alumina fibres or threads so as to provide a thickness compatible with the breakdown voltage of the evacuated space between the plates.

Figure 7:
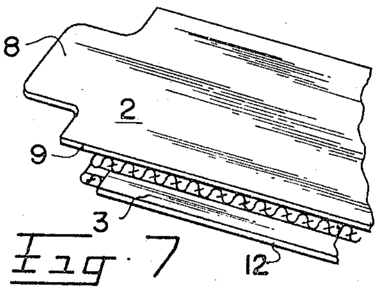
FIG. 7 is a perspective view illustrating the arrangement of dielectric and metallic strips and the end construction of one of the metallic strips which facilitates winding the composite strips into a spiral winding.
Figure 3:
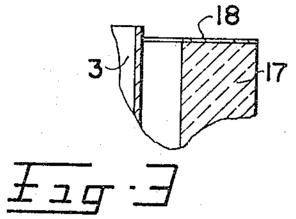
FIG. 3 is a fragmentary view of one corner of the capacitor plate assembly after it is inserted in the dielectric envelope portion but before the end plates are brazed thereto.

As shown best in FIG. 7, the metal strip 2 is preferably provided with a tab portion 8 at one end to facilitate winding of the composite pack of strips and dielectric material on a mandrel. The adjacent longitudinal edges 9 and 12 of the metal strips 2 and 3, respectively, are laterally offset so that the edge 12 of strip 3 projects a short amount beyond the edge 9 of strip 2. Conversely, the longitudinal edge 9 of the strip 2 extends laterally beyond the edge 12 of metal strip 3. With this arrangement of the strips it will be seen that upon winding of the metal and dielectric strips 2, 3 and 7, one set of fixed capacitor plates, constituted by the strip 2, will be offset axially with respect to the other set of plates constituted by the spirally wound strip 3.

Figure 6:
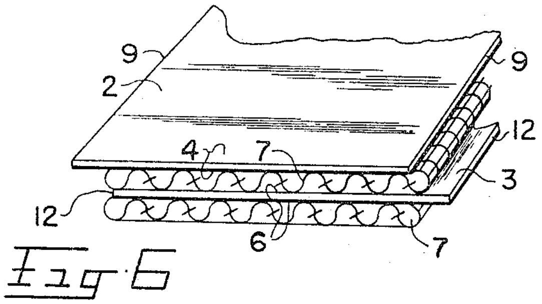
FIG. 6 is an enlarged perspective view illustrating the relationship between opposed capacitor plates and the two strips of dielectric material.
Figure 5:
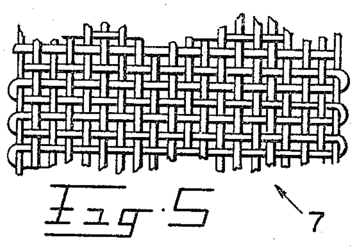
FIG. 5 is a plan view of a short section of woven quartz cloth which is interposed between the plates of the capacitor.
Figure 2:
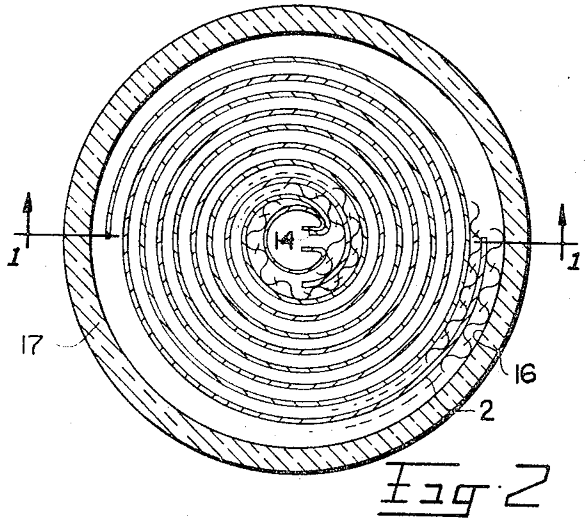
FIG. 2 is a horizontal cross-sectional view taken in the plane indicated by the line 2—2 in FIG. 1.

As shown best in FIG. 2, the strips 2 and 3, with the interposed dielectric strips, are preferably wound on a resilient core 13 split as shown to provide spaced tabs 14 permitting resilient compression of the core. Upon winding into the configuration illustrated best in FIG. 2, the wound coil is fitted into the inner periphery 16 of a tubular dielectric envelope member 17 having metalized end edges 18. The dielectric member 17 is preferably fabricated from aluminum oxide ($Al_2O_3$) which provides a vacuum tight wall having the requisite dielectric strength.

The central core member 13 is considerably shorter than the width of the strips 2 and 3. Additionally, it will be seen that the strips 2 and 3 as wound provide an overall coil length somewhat longer than the length of ceramic member 17. It has been found that when the length of the wound metallic and dielectric coil exceeds the length of ceramic at each end by approximately .010", assembly of the unit is greatly facilitated as will hereinafter be explained. After final assembly the overall width of the composite metallic-dielectric strip capacitor plate assembly equals the length of the ceramic member 17. From the foregoing it will be apparent that with the exterior periphery of the capacitor plate assembly confined within the inner periphery of the dielectric envelope member, the effect of the resilient core member 13 is to keep the various windings of the capacitor, both metallic and dielectric, tightly compressed between the core member and the inner periphery of the dielectric envelope member. Preferably, several turns of woven quartz strip material are wound about the last turn of metal strip to insure that the last turn of metal strip is spaced a small distance from the inner periphery of the envelope. This prevents vibration of the capacitor plates and relative movement between the plates upon impact shocks.

Figure 1:
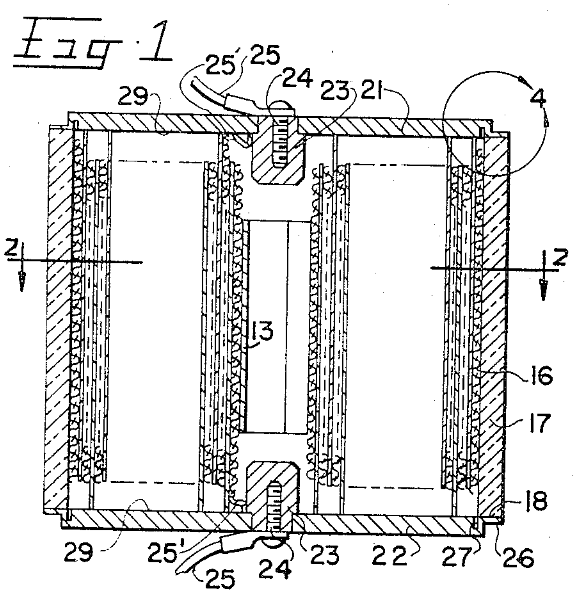
FIG. 1 is a vertical cross-sectional view taken in the plane indicated by the line 1—1 in FIG. 2.
Figure 4:
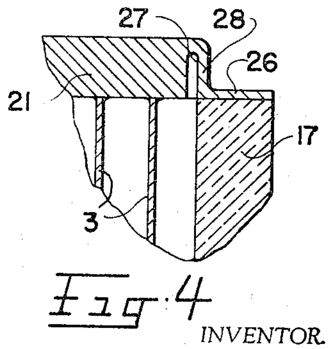
FIG. 4 is a fragmentary sectional view similar to FIG. 3 but showing the assembly after the end plates are brazed.

Closing each opposite end of the dielectric envelope member 17 are annular metallic end plates 21 and 22, shown best in FIG. 1. Each of the plates is preferably formed from oxygen-free high-conductivity copper, or some other suitable metal such as aluminum having high ductility and high electrical conductivity. Centrally disposed within the inner periphery of each plate is a boss 23 extending into the envelope and provided with a threaded bore 24. The bosses are proportioned so as not to interfere with the spiral capacitor plates or the associated ends of the resilient core member 13. They function to permit connection of the capacitor into a circuit as shown by leads 25. A flexible auxiliary lead 25', which may be considered, in effect, an extension of lead 25, connects each end plate to the associated capacitor plate 2 or 3 while the end plates are still separated from the associated end of the ceramic envelope portion to permit electrical processing of the capacitor before the envelope is sealed.

In order to accommodate differences in thermal expansion and contraction between the end plates 21 and 22 and the abutting ceramic member 17, the outer peripheral edge portion of each of the end plates is formed in a configuration to provide a compact yet flexible union between these abutting metallic and non-metallic members. Specifically, each end plate is formed with a rabbet about its outer periphery as shown to provide a radially extending flange 26. The depth of the rabbet is proportioned so as to leave a flange with a thickness of approximately .031" and a width sufficient to span the radial thickness of the envelope wall. The rabbet and flange 26 will not by themselves provide the requisite flexibility in the union of the end plates to the associated ends of the ceramic member 17. To provide the requisite flexibility, each of the end plates is provided with an axially extending peripheral groove 27 spaced radially inwardly from the outer periphery of the end plates an amount to provide a cylindrical flange 28 on each plate having a thickness of approximately .031". It will thus be seen that with the flanges 26 hermetically brazed to the associated metalized end of ceramic member 17, differences in expansion and contraction between the metal end plates and the ceramic envelope member will be accommodated by flexure of the cylindrical flange 28. To relieve stresses which might be created by sharp corners, the flange 28 preferably merges smoothly into the end plate as shown. Since this flange is formed of the same high ductility material as the end plates, after brazing the ceramic member will dominate the metallic flange and prevent rupture of the seal.

Inasmuch as the fixed capacitor herein described is dependent upon a high vacuum as the electrically insulating medium between opposed plates, the method of assembly to insure an absolutely clean and non-contaminated interior in the envelope is of utmost importance. The invention disclosed herein thus includes as a novel aspect the method of assembly hereinafter described. After winding the coil of capacitor plates and dielectric spacer strips and fitting the coil into the ceramic envelope portion as previously described so as to have each set of plates projecting from the associated end of the ceramic a small amount, this subassembly is ready to be united to the end plates.

Prior to final assembly of the end plates on the dielectric envelope member 17, each of the plates is plated on its interior surface 29 with a layer of nickel. The nickel plate performs two functions, one being that it protects the inner surface of each plate against erosion by brazing alloy, and secondly, it functions to facilitate wetting of the inner surface 29 of each of the end plates by a braze compound interposed between each such nickel plated face 29 and the adjacent ends or longitudinal edges of the capacitor plates 2 and 3.

The end plates and ceramic-enclosed coil are positioned within an appropriate vacuum oven structure (not shown) in a manner that the end plates remain spaced a short distance (¼" is adequate) from the ends of the ceramic. Braze material is of course interposed between the end edges of the ceramic and the associated flanges 26 and may be either in sheet or paste form, or pre-fused to surface 29. Electrical connection is made to each of the plates through leads 25 and 25' as shown. The oven is next evacuated and heated to preliminary heat the components to a first temperature of approximately 400° F. while the oven is continuously pumped to achieve a vacuity of at least $10^{-4}$ torr. An elevated electrode processing voltage is impressed on opposite electrodes consistant with the degree of vacuity and the selected spacing between the electrodes. Heating of the component results in impurities being driven off the component and the interior of the oven, and also has the effect of raising the pressure within the vacuum oven. This preliminary temperature is accordingly maintained for a time sufficient to permit the pressure within the oven to again drop to at least $10^{-4}$ torr. When this degree of vacuity is reached the electrical charge is removed from the electrodes, and the temperature is raised to a second predetermined temperature of at least 1400° F., at which temperature the braze material becomes molten, but below the rapid vaporization temperature of the braze material. Gases and impurities evolved from the braze material and other parts of the assembly are removed through the vacuum system which continues to pump during the entire heating cycle. As before, the increase in temperature has the effect of raising the pressure within the vacuum oven. Accordingly, this second temperature is maintained for a period sufficient to allow the pumping system to again reduce the pressure to at least $10^{-4}$ torr. The temperature of the component is again raised to a predetermined third temperature past the brazing temperature, in the order of 1440° F., and this temperature is maintained until the pressure within the oven is reduced to $10^{-4}$ torr. The oven heat source is then deenergized. When a satisfactory degree of evacuation is reached, the spaced parts of the assembly are brought into abutting relation, whereupon the molten braze material seals all parts into a composite unit. The flexible pigtails 25' of course collapse into the central zone around bosses 23 when the end plates are brought together.

It should be noted at this point that because of the approximately .010" projection of the plates beyond the ceramic, the inner nickel plated faces 29 of the end plates engage the ends of the wound capacitor plates before the flanges 26 abut the associated ends of the ceramic. This is important because it insures that the long edge of each plate for its entire length will be embedded in a molten pool of braze material. This type of a continuous union between each condenser plate and associated end plate results in each end plate functioning as a heat sink for the condenser plate to which it is united. Such cooperation between these members also aids in drawing heat out of the quartz spacer, thus increasing the power handling capabilities of the capacitor, and functions also to lend rigidity to the condenser plate structure.

It will now be apparent that by charging the plates with potentials of opposite sign through the leads 25 and 25' the capacitor may be electrically processed by the application of high voltages before the envelope is sealed but after it has been evacuated. Impurities that are driven from the plates are quickly drawn out of the envelope through the approximately ¼" space between the ceramic and flanges 26. Upon completion of the electrical testing, the temperature is raised to melt the braze material, the end plates are moved toward each other to close the gap, whereupon the braze material hermetically seals the flanges to the ceramic and brazes the spirally wound capacitor plates to the end plates. The capacitor is now complete and may be removed from the oven after cooling for further processing and testing.

From the foregoing it will be apparent that the dielectric or insulating characteristics of the capacitor are determined by the degree of evacuation of the envelope and not by the dielectric strength of the quartz material interposed between the plates 2 and 3. Because the quartz material constitutes a woven fabric, the ready escape of gases during evacuation is permitted, thus insuring a clean interior. This would not be true if the dielectric material were an impervious sheet of material. It should be noted also that because of the nature of the woven fabric, the individual fibres thereof are subjected to relatively low voltage gradients as a result of their small size. Furthermore, since the fibers lie more-or-less parallel to the capacitor plates, the voltage gradient along the fibres is very low. The low voltage gradient in the dielectric material obtained by this construction will greatly minimize any tendency for heating and degradation of the dielectric. Additionally, it will be obvious that the dielectric material, because it abuts both surfaces of plates 2 and 3, functions to mechanically strengthten the unit and provide a rigid and vibration-free capacitor.

A further advantageous feature of this construction lies in the fact that repeated arc-overs caused by transients and the like do not reduce the high insulation value of the vacuum dielectric. Metal vaporized by arcing immediately condenses on surrounding metal and does not form a continuous and conductive film because of the very large and discontinuous surface area of the fibers.

Although cloth woven of fused silicon fibers has been repeatedly mentioned in the description above by way of example, other fiberous materials are suitable and even superior to silica in some applications. For example, cloth woven from fused alumina fibres will find application at extremely high frequencies. Likewise cloth woven from glass fibres of various compositions will be useful for less severe applications, especially at lower frequencies. Felted sheets and sheets made of randomly oriented heat resistant fibres are also useful in the construction of the above-described capacitor and offer the advantage of reduced cost.

I claim:

1. The method of assembly of a vacuum electronic component having spaced electrodes enclosed within a tubular dielectric envelope portion by metallic end plates closing opposite ends thereof and electrically connected to the spaced electrodes, consisting of the steps of supporting the tubular dielectric enevlope portion, said electrodes and said end plates in spaced apart relation within a vacuum oven including an energizable heat source with each of said end plates electrically connected to an associated electrode, energizing the oven to preliminarily heat said component to a first temperature, charging said spaced electrodes with electrical charges of opposite sign while said component is held at said first temperature for a time sufficient to produce a predetermined degree of vacuity within the component, removing the electrical charges from said electrodes, raising the temperature of the component to a second predetermined temperature and holding the component at that temperature until a predetermined degree of vacuity within the component is obtained, raising the temperature of said component to a predetermined third temperature past the melting point of brazing material thereon deenergizing the oven heat source, and effecting relative movement of said end plates and tubular dielectric envelope portion until the end plates abut the envelope portion and said electrodes to braze the end plates to the electrodes and to the dielectric portion and hermetically seal the envelope.

2. The method according to claim 1, in which relative movement of the end plates and dielectric envelope portion is effected by first moving one end plate into abutting relation with one of said electrodes, continuing the movement of that end plate and the electrodes and the dielectric envelope portion toward the other end plate until the other electrode abuts the other end plate while the end plates remain spaced from the envelope portion, and continuing such relative movement until the end plates and the associated ends of the tubular dielectric envelope portion come into abutting relation.

3. The method according to claim 1, in which said first temperature is approximately 400° F.

4. The method according to claim 1, in which said electrical charge amounts to a voltage high enough to electrically process the electrodes while consistent with the selected spacing between said electrodes in a vacuum of at least $10^{-4}$ torr.

5. The method according to claim 1, in which said predetermined degree of vacuity is at least $10^{-4}$ torr.

6. The method according to claim 1, in which said second predetermined temperature amounts to at least 1400° F.

7. The method according to claim 1, in which said third predetermined temperature amounts to 1400° F.

8. The method according to claim 7, in which said third temperature is held substantially constant for a period only long enough to recover said predetermined degree of vacuity.

References Cited

UNITED STATES PATENTS

| | | | |
|---|---|---|---|
| 2,339,663 | 1/1944 | Teare | 317—244 X |
| 2,524,000 | 9/1950 | Spencer | 317—244 |
| 3,109,968 | 11/1963 | Jennings | 317—244 |

WILLIAM I. BROOKS, *Primary Examiner.*